Oct. 19, 1926.　　　　　　　　　　　　　　　　1,603,545
C. E. JOHNSON
MOLD FOR BIMETALLIC ROTORS
Filed July 13, 1925
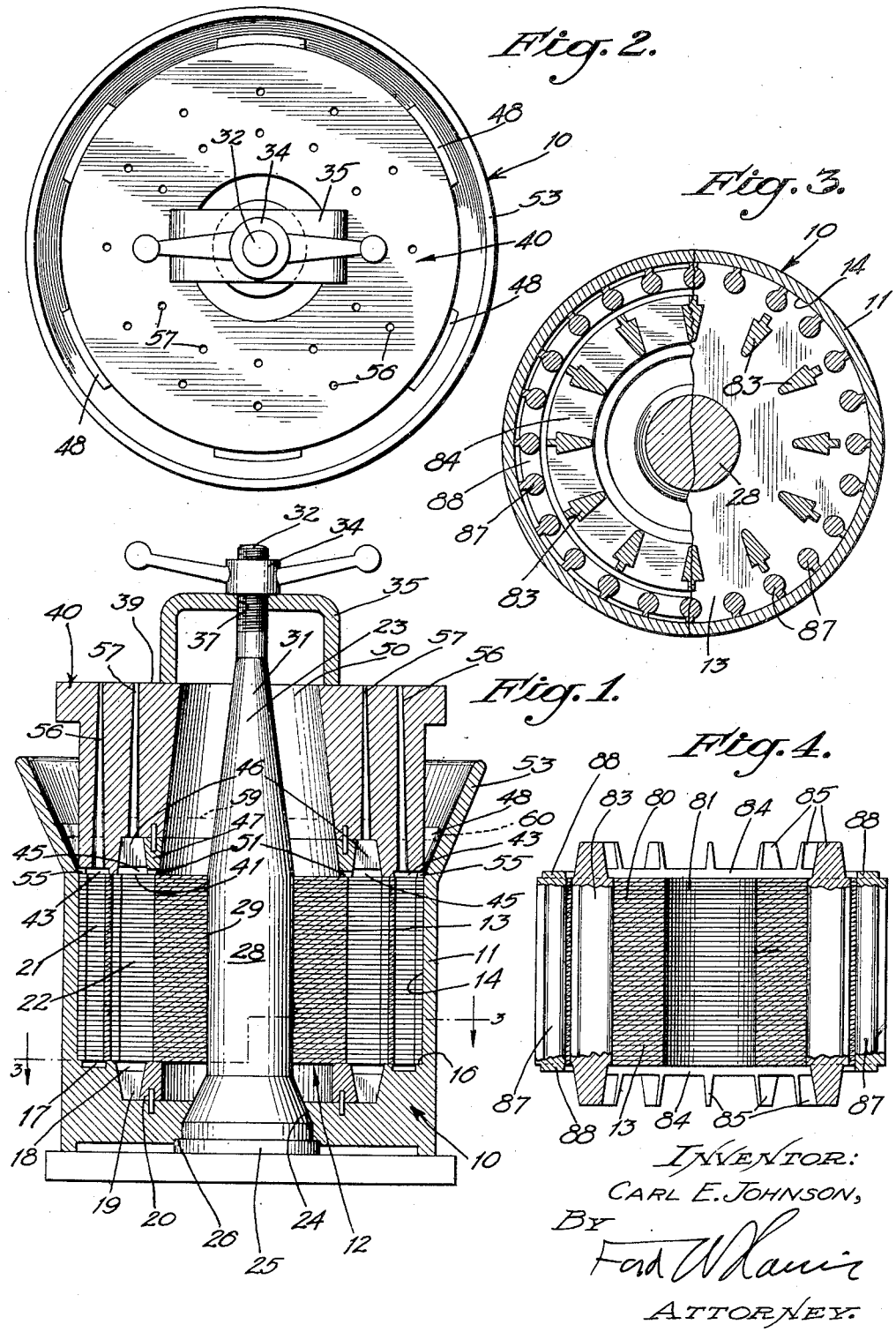

Patented Oct. 19, 1926.

1,603,545

UNITED STATES PATENT OFFICE.

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA.

MOLD FOR BIMETALLIC ROTORS.

Application filed July 13, 1925. Serial No. 43,140.

My invention is especially adapted for use in casting squirrel-cages for rotors of induction motors such as shown and described in my patent application entitled Bimetallic rotor for induction motors, filed December 16, 1924, Serial No. 756,225.

It is an object of this invention to provide a mold for producing a rotor for an induction motor.

It is also an object of my invention to provide a mold for producing a rotor for induction motors which eliminates the use of the compensator or starting device.

It is also an object of my invention to provide a mold for producing a rotor having a main winding and an auxiliary winding.

It is a further object of my invention to provide a mold for producing a rotor having main and auxiliary windings, one of which windings is of high resistance and the other of which windings is of low resistance.

It is a further object of my invention to provide a mold for producing a rotor having main and auxiliary windings, both of which have comparatively large areas of cross section so that heat will be readily dissipated therefrom.

It is a still further object of my invention to provide a mold for producing a rotor having conductor bars and end rings which require no machining and which are formed integral.

It is another object of my invention to provide a mold of the character mentioned which will be of very simple construction and will require but a small investment.

It is a still further object of my invention to provide a process by which my novel rotor may be produced.

Other objects and the particular advantages of my invention will be made manifest hereinafter.

Referring to the drawings in which I illustrate a preferred form of my invention:

Fig. 1 is a vertical sectional view through a mold incorporating the features of my invention.

Fig. 2 is a plan view of Fig. 1.

Fig. 3 is a sectional view taken on the line 3—3 of Fig. 1 after metal has been poured into the mold.

Fig. 4 is a cross section taken through a rotor produced in the mold of my invention.

With reference to the drawings, the form of my invention shown has a body 10 providing a cylindrical wall 11 which forms a lamination receiving chamber 12. Laminations 13 are placed in the chamber 12, the peripheries of these laminations 13 being of substantially the same size as an inner cylindrical face 14 of the wall 11. A radial annular face 16 is provided at the lower end of the cylindrical face 14 against which face 16 the lowermost of the laminations 13 rests. A lower outer annular ring channel 17 and a lower inner annular ring channel 18 are provided in the face 16, as shown clearly in Fig. 1. The body 10 is recessed so as to provide a series of wing slots 19 which connect with the inner annular ring channel 18. The body 10 is provided with a body ring 20 which is suitably secured in place, as shown clearly in Fig. 1, so as to permit a machining of the wing slots 19. The laminations 13 are provided with a series of outer conductor bar openings 21 which extend parallel to the axis of the laminations 13 and which are arranged in circular disposal therearound, these outer openings 21 coinciding with the outer lower ring slots 17. Inner conductor bar openings 22 are provided in the laminations 13 which extend parallel to the axis of the laminations 13 and which are circularly disposed therearound, these conductor bar openings 22 coinciding with the lower inner ring channel 18. A mandrel 23 extends upwardly through an opening 24 in the lower part of the body 10. A head 25 of the mandrel 23 engages a shoulder 26 of the body 10. A cylindrical portion 28 of the mandrel 23 extends through central openings 29 formed in the laminations 13. The mandrel 23 is tapered at 31 and has the extreme upper end 32 threaded to receive a handled nut 34. A yoke 35 is arranged below the nut 34, the portion 32 of the mandrel 23 extending through an opening 37 in the yoke 35. When the nut 34 is screwed downward on the threaded portion 32, the yoke 35 is forced against an upper face 39 of the cap 40. This forces a lower radial wall 41 of the cap 40 against the uppermost of the laminations 13, compressing these laminations tightly in the body 10.

The cap 40 is provided with an upper outer annular ring channel 43 which is provided in the radial wall 41 and which coincides with the outer conductor bar openings 21. An inner ring channel 45 is provided in the radial wall 41, this ring channel 45 coinciding with the inner conductor bar openings 22. Wing slots 46 are provided in the cap 40 which connect with the inner ring channel 45. The cap 40 is provided with a cap ring 47 which is secured in place as shown clearly in Fig. 1, to permit a machining of the wing slots 46.

The cap 40 is guided into the upper end of the lamination receiving chamber 12 by means of radially extending centralizing lugs 48 which are spaced around the circumference of the chamber 12 slightly thereabove, as clearly shown in Figs. 1 and 2.

Metal is poured into the ring channels 18 and 45 and the wing slots 19 and 46 and conductor bar openings 22 through a pouring opening 50 formed in the cap 40, this pouring opening 50 connecting with the inner ring channel 45 through passages 51, as clearly shown in Fig. 1. A pouring portion in the form of a bell 53 is provided at the upper end of the body 10, this pouring portion connecting with the outer ring channel 43 through ducts 55, the metal entering through these ducts and filling the ring channels 17 and 43 and the conductor bar openings 21. Risers 56 are provided in the cap 40 for the escape of gas from the ring channel 43 and risers 57 are provided in the cap for the escape of gas from the ring channel 45 through the slots 46.

After the laminations 13 have been placed in the lamination receiving chamber 12, the cap 40 is placed, as shown, and the laminations are rigidly clamped in place by means of the mandrel 23, the handled nut 34 and the yoke 35. The mold is then placed in a suitable preheating furnace and preheated to a desirable temperature. The mold is then removed from the preheating furnace and a molten metal is poured through the central pouring opening 50 of the cap 40, this metal flowing through the passages 51 into the ring channel 45. This metal flows also through the inner conductor bar openings 22 and into the ring channel 18 and the wing slots 19. The metal is poured to a level as indicated by the dotted lines 59, completely filling the wing slots 46. As the metal cools and slightly shrinks, it may be followed up with a little more metal to compensate for this shrinkage. Other molten metal is similarly poured into the bell 53, this second metal passing through the ducts 55 into the ring channel 45, the conductor bar openings 21 and the ring channel 17, this metal being poured to a level 60. Any gas which forms in the mold may readily pass out through the risers 56 or 57. When the pouring is completed, the mold is allowed to cool in a suitable manner.

To successfully produce a perfect rotor, it is necessary to faithfully conform to certain regulations. The mold must be preheated to a fairly accurate temperature; if not, the rings when the rotor is taken out of the mold will be found to be checked. It is also important that the metal being poured be at a certain temperature. A job after it is poured should be cooled in a proper manner. It should be allowed to cool slowly and gradually so that the conductor bars and the end rings will cool at substantially the same rate of speed. It has been found that if the metal cools too rapidly, the end rings will cool off faster than the conductor bars and will contract in such a manner that the metal is likely to crack. It is desirable to place the mold on a suitable vibrator or shaker during the pouring and immediately thereafter so that the gases may be thoroughly liberated from the mold and thus prevent blow-holes. After the rotor has properly cooled, it is removed from the mold by unscrewing the nut 34 from the mandrel 23 and removing the yoke 35 and the cap 40 from place, the mandrel 23 also being removed.

From Fig. 1 it will be seen that all of the faces of the mold exposed to contact with poured metal are formed with sufficient draft so that all of the parts may readily move from place. After the rotor is removed from the mold, it is necessary to cut off short portions which form in the risers and to cut the material at the passages 51 and the ducts 55, this being the only machine work necessary to the entire production of the rotor. The pouring opening 50 may be poured with a low resistance material and the pouring bell 53 may be poured with a high resistance material, thus forming two windings of specific resistances.

From Fig. 4 I show in section a rotor produced by the process of my invention and the mold of my invention. The laminations form a magnetic body 80 having a central opening 81 through which a shaft of a rotor may be extended. In the inner conductor bar openings 22, conductor bars 83 are formed, these conductor bars 83 being of axial extension and being in circular arrangement around the axis of the magnetic body 80. End rings 84 are formed at the ends of the conductor bars 83 and impeller wings 85 are formed on the wings 84. The wings 85 cause agitation of the surrounding air when the rotor is revolved, thus providing a cooling circulation of air for the motor in which it is used. In the outer conductor bar slots 21, conductor bars 87 are formed which extend parallel to the axis of the magnetic body 80 and which are arranged circularly therearound. End rings 88 are formed integral at the end of the conductor bars 87. As mentioned, the conductor bars 83, the end rings 84 and the wings 85 are of low resistance, whereas the conductor bars 87 and the end rings 88 are of high resistance. By using metals having low and high resistances, respectively, it is possible to provide both windings of large area of cross section, thus increasing the heat dissipating capacity of these windings and also making the casting of these windings easy. By casting the conductor bars and end rings in one piece, there will be no trouble due to imperfect connections, as sometimes occurs when the conductor bars and end rings are made in separate parts and riveted together. Also by making the conductor bars and end rings integral, they serve additionally as a means for securing the laminations together.

From the foregoing description it is evident that the rotor made in compliance with the process of my invention has many features which are of much value in the motor industry. The mold of my invention provides many features which are thoroughly explained in the description which make it very suitable to produce the rotor shown in Fig. 4 in a very simple and expedient manner.

I claim as my invention:

1. A mold for making rotors comprising: walls forming a chamber adapted to receive a core; walls forming inner and outer end ring channels at one end of said core; and walls forming inner and outer end ring channels at the other end of said core.

2. A mold as defined in claim 1 in which there is means connected with one of said outer end ring channels and means connected with one of said inner end ring channels for permitting melted metal to be separately poured into said inner and outer end ring channels.

3. A mold for making rotors, said mold comprising: a body, said body being arranged to receive punchings and having an outer ring channel and an inner ring channel; and a cap for said body comprising an outer ring channel and an inner ring channel.

4. A mold for making rotors, said mold comprising: a body, said body being arranged to receive punchings and having an outer ring channel and an inner ring channel; a cap for said body comprising an outer ring channel and an inner ring channel; and means for clamping said cap to said body in a manner to compress said punchings.

5. A mold for making rotors, said mold comprising: a body consisting of a cylindrical wall forming a punching receiving chamber, a radial annular face situated at the lower end of said cylindrical wall, an outer ring channel formed in said radial annular face, an inner ring channel formed in said radial annular face, a pouring portion formed at the upper end of said cylindrical wall, and centralizing lugs formed in said pouring portion, the inner faces of said centralizing lugs being concentric and of the same radius as said cylindrical wall; a cap for said body, said cap comprising a cylindrical outer wall, said wall being guided by said centralizing lugs into the upper end of said punching receiving chamber, a radial wall formed at the lower end of said cylindrical outer wall, an outer ring channel formed in said radial wall, an inner ring channel formed in said radial wall, a pouring opening; passages for connecting said pouring opening with said inner ring channel, and ducts for connecting said outer ring channel with said pouring portion of said body; and means for clamping said body and said cap together so as to compress punchings between said radial face of said body and said radial wall of said cap.

6. A mold for making rotors comprising; a body having an inner and an outer ring channel; and a cap having an inner and an outer ring channel, said body and said cap being adapted to have rotor punchings placed therebetween so that said inner and outer ring channels rest thereagainst, there being an outer pouring passage connected to one of said outer ring channels and an inner pouring passage connected to one of said inner ring channels.

7. A mold for making rotors comprising: a body having an inner and an outer ring channel; a cap having an inner and an outer ring channel, said body and said cap being adapted to have rotor punchings placed therebetween so that said inner and outer ring channels rest thereagainst, there being an outer pouring passage connected to one of said outer ring channels and an inner pouring passage connected to one of said inner ring channels; and means for clamping said body and said cap against the punchings.

8. A mold for making rotors comprising: a body having an inner and an outer ring channel; a cap having an inner and an outer ring channel, said body and said cap being adapted to have rotor punchings placed therebetween so that said inner and outer ring channels rest thereagainst; and means for guiding said cap into proper position against said punchings.

9. A mold for making rotors comprising: a body having an inner and an outer ring channel; a cap having an inner and an outer ring channel, said body and said cap being adapted to have rotor punchings placed therebetween so that said inner and outer ring channels rest thereagainst; means for clamping said body and said cap against the punchings; and means for guiding said cap into proper position against said punchings.

10. A mold for making rotors comprising: a body having an inner and an outer ring channel; a cap having an inner and an outer ring channel, said body and said cap being adapted to have rotor punchings placed therebetween so that said inner and outer ring channels rest thereagainst, there being an outer pouring passage connected to one of said outer ring channels and an inner pouring passage connected to one of said inner ring channels; and means for guiding said cap into proper position against said punchings.

11. A mold for making rotors comprising: a body having an inner and an outer ring channel; a cap having an inner and an outer ring channel, said body and said cap being adapted to have rotor punchings placed therebetween so that said inner and outer ring channels rest thereagainst, there being an outer pouring passage connected to one of said outer ring channels and an inner pouring passage connected to one of said inner ring channels; means for clamping said body and said cap against the punchings; and means for guiding said cap into proper position against said punchings.

12. A mold for making rotors comprising: a body having a chamber adapted to receive punchings which have axial outer and inner conductor bar openings formed therein and having an outer ring channel and an inner ring channel connecting respectively to said outer and inner conductor bar openings; an outer winding pouring means situated at the upper part of said body; a cap adapted to engage said punchings having an outer and an inner ring channel which connect respectively to said outer and inner conductor bar openings, an inner winding pouring means communicated with said inner ring channel of said cap, and means whereby said outer winding means is communicated with said outer ring channel of said cap; and means for clamping said cap and said body against said punchings.

13. A mold for making rotors comprising: a body having a chamber adapted to receive punchings which have axial outer and inner conductor bar openings formed therein, and having an outer ring channel and an inner ring channel connecting respectively to said outer and inner conductor bar openings; an outer winding pouring means situated at the upper part of said body; a cap adapted to engage said punchings having an outer and an inner ring channel which connect respectively to said outer and inner conductor bar openings, an inner winding pouring means communicated with said inner ring channel of said cap, and means whereby said outer winding means is communicated with said outer ring channel of said cap; means for clamping said cap and said body against said punchings; and guide means for guiding said cap into proper position against said punchings.

In testimony whereof, I have hereunto set my hand at Los Angeles, California, this 6 day of July, 1925.

CARL E. JOHNSON.